United States Patent [19]

Murano et al.

[11] Patent Number: 5,428,801
[45] Date of Patent: Jun. 27, 1995

[54] DATA ARRAY CONVERSION CONTROL SYSTEM FOR CONTROLLING CONVERSION OF DATA ARRAYS BEING TRANSFERRED BETWEEN TWO PROCESSING SYSTEMS

[75] Inventors: Keiji Murano, Nara; Masafumi Sakamoto, Sumoto, both of Japan

[73] Assignee: Sharp Kabushiki Kaisha, Osaka, Japan

[21] Appl. No.: 485,654

[22] Filed: Feb. 27, 1990

[30] Foreign Application Priority Data

Feb. 28, 1989 [JP] Japan ................................... 1-47097

[51] Int. Cl.[6] .................... G06F 3/00; G06F 13/00
[52] U.S. Cl. .................... 395/500; 395/200; 364/920.7; 364/931.4; 364/230; 364/259.4; 364/DIG. 1
[58] Field of Search ............... 364/200, 900; 395/425, 395/275, 325, 500, 200

[56] References Cited

U.S. PATENT DOCUMENTS 4,527,232 7/1985 Bechtolsheim ................ 395/400
4,580,240 4/1986 Watanabe ..................... 395/425
4,935,894 6/1990 Ternes et al. .................. 395/325
4,992,931 2/1991 Hirasawa ...................... 395/500

FOREIGN PATENT DOCUMENTS 62-150435 7/1987 Japan .
63-12057 1/1988 Japan .

Primary Examiner—Alyssa H. Bowler
Assistant Examiner—Meng-Ai T. An

[57] ABSTRACT

A data array conversion control system comprises a first data processing unit (1) for processing character code data and image data and a second data processing unit (2) for processing the character code data of the same data array and the image data of a different data array, and the first and second data processing units (1) and (2) are connected with each other through a data array converting unit (3) for converting the data array of the image data based on switching signals, which are applied from the first data processing unit (1) to the data array converting unit (3) in a unit of one word data together with the transfer data, so that the data array of the image data is converted.

10 Claims, 5 Drawing Sheets

Fig. 2(a)

NORMAL MODE

| FIRST DATA BUS | D0 | D1 | D2 | D3 | D4 | D5 | D6 | D7 | D8 | D9 | D10 | D11 | D12 | D13 | D14 | D15 |
|---|---|---|---|---|---|---|---|---|---|---|---|---|---|---|---|---|
| SECOND DATA BUS | D0 | D1 | D2 | D3 | D4 | D5 | D6 | D7 | D8 | D9 | D10 | D11 | D12 | D13 | D14 | D15 |

Fig. 2(b)

TWIST MODE

| FIRST DATA BUS | D0 | D1 | D2 | D3 | D4 | D5 | D6 | D7 | D8 | D9 | D10 | D11 | D12 | D13 | D14 | D15 |
|---|---|---|---|---|---|---|---|---|---|---|---|---|---|---|---|---|
| SECOND DATA BUS | D7 | D6 | D5 | D4 | D3 | D2 | D1 | D0 | D15 | D14 | D13 | D12 | D11 | D10 | D9 | D8 |

DATA ARRAY CONVERSION CONTROL SYSTEM FOR CONTROLLING CONVERSION OF DATA ARRAYS BEING TRANSFERRED BETWEEN TWO PROCESSING SYSTEMS

BACKGROUND OF THE INVENTION

1. Field of the Invention

The present invention relates to a data array conversion control system for converting data arrays between different kinds of processors such as Japanese word data processors or other word processors.

2. Description of the Prior

FIG. 1 is a block diagram showing an example of a data processing system employing a conventional data array conversion control system. As shown in FIG. 1, there are provided a first processor 37 and a second processor 38 in a first data processing unit 31 and there is also provided a third processor 39 in a second data processing unit 32 for processing data of a data array same as that of the data generated by the first processor 37 and for processing data of a data array different from that of the data generated by the second processor 38. The output data of the first and second processors 37 and 38 in the first data processing unit 31 are transferred to the third processor 39 in the second data processing unit 32 via a first data bus 35 and through a data array converting unit 33 and via a second data bus 36.

The mode of the operation of the data array converting unit 33 is selected between a normal mode and a twist mode. When the mode of the data array converting unit 33 is set to the normal mode, the data entered in the data array converting unit 33 are outputted without any conversion as shown in FIG. 2(a), and when set to the twist mode, the data entered in the data array converting unit 33 are outputted the data array is outputted after conversion as shown in FIG. 2(b). The selection between the normal mode and the twist mode is realized in response to receiving a mode switching signal generated by a mode switching unit 34 when the mode switching unit 34 receives a switch command signal sent from the first processor 37.

FIG. 3 shows another example of a conventional data processing unit employing a common memory unit 41, in addition, for delivery of data between the first data processing unit 31 and the second data processing unit 32. In FIG. 3, the first and second data processing units 31 and 32 are configured so that when character code data of a data array are transmitted from the first data processing unit 31 to the second data processing unit 32, the character code data of the same data array are processed in the second data processing unit 32, and that when image data of a data array are transmitted from the first data processing unit 31 to the second data processing unit 32, the image data of a different data array are processed in the second data processing unit 32. The character code data and the image data are respectively outputted from the first and second processors 37 and 38 in the first data processing unit 31 so as to be transferred to the third processor 39 in the second data processing unit 32 through the first data bus 35, data array converting unit 33, common memory unit 41, bus buffer 42 and the second data bus 36. It is also possible to gain access for writing data into storage of the common memory unit 41 from both of the first and second processing units 31 and 32 through an address selecting unit 40. The timing of the access to the common memory 41 is controlled by a control unit (not shown).

When the character code data and image data are respectively transferred from the first and second processors 37 and 38 to the third processor 39 at the same time, the data array converting operation is performed in accordance with a flow chart shown in FIG. 4.

That is to say, in the first step S1, the mode of the data array converting unit 33 is set to the normal mode in response to receiving the mode switching signal sent by the mode switching unit 34 on the basis of a switch command signal sent from the first processor 37. Subsequently in the step S2, the character code data of one word are generated from the first processor 37. The output character code data of the first processor 37 are transferred to the common memory unit 41 through the data array converting unit 33 without any array conversion. In the next step S3, the mode of the data array converting unit 33 is set to the twist mode in response to receiving the switch command signal sent from the first processor 37 to the mode switching unit 34. Next in the step S4, the image data of one word are generated from the second processor 38 and sent to the data array converting unit 33 where the data array of the image data is converted. The output image data with the converted data array are transferred from the data array converting unit 33 to the common memory unit 41. These operations are repeated hereafter until the process of the transfer data is completed.

As described above, since the character code data without any array conversion data array and the image data with their data array conversion are respectively stored in the common memory unit 41, the character code data and the image data read out from the common memory unit 41 can be processed without converting the data arrays in the third processor 39.

However, in the conventional data array conversion control system, the mode switching operation of the data array converting unit 33 is performed between the normal mode and the twist mode on the basis of the switch command signal sent from the first processor 37 to the mode switching unit 34, so that it is necessary that the switch command signals should be generated from the first processor 37 every time the transfer data generations are switched between the first and second processors 37 and 38 for generating the character code and image data respectively. In particular, when the image data are transferred from the second processor 38 to the common memory unit 41, since the switch command signal is generated from the first processor 37 at the same time of transferring the data from the second processor 38, the process of the data becomes complicated. Moreover, in the case that the accesses of the first and second processors 37 and 38 are performed in a time-shared data management, the data process becomes very complicated. Therefore, there is a problem that the data can not be transferred at a high speed.

SUMMARY OF THE INVENTION

In order to solve the problem mentioned above, an essential object of the present invention is to provide a data array conversion control system capable of easily controlling the data array conversion in the data array converting unit, enabling to transfer data at a high speed.

According to the feature of the present invention, a data array conversion control system comprises first and second data processing units each processing data of different data arrays and the first and second data processing units are connected with each other through a data array converting unit for converting the data array of the data on the basis of switch command signals, wherein the switch command signals are transmitted together with the data in a unit of the data transfer, the data being transferred from the first data processing unit to said second data processing unit through the data array converting unit.

As described above, since the data array of the data is converted in the data array converting unit on the basis of the switch command signals and the switch command signals are transmitted with the transfer data, the data array conversion can be easily controlled, thereby enabling to transfer the data at a high speed.

The features of the present invention which are believed to be novel are set forth with particularity in the appended claims. The present invention together with further objects and advantages thereof may best be understood with reference to the following detailed description, taken in conjunction with the accompanying drawings.

BRIEF DESCRIPTION OF THE DRAWINGS

FIGS. 2(a) and 2(b) are diagrams showing data conversion modes of a data array converting unit.

DETAILED DESCRIPTION OF THE PREFERRED EMBODIMENT

Figure 6:
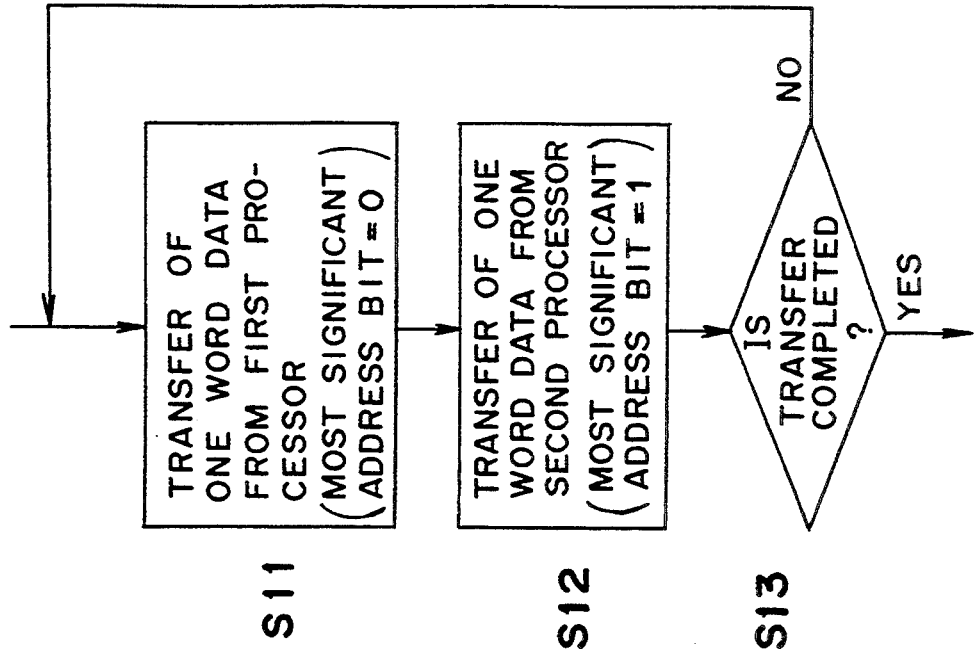
FIG. 6 is a flow chart showing the operation of the data transfer in the embodiment shown in FIG. 5.
Figure 4:
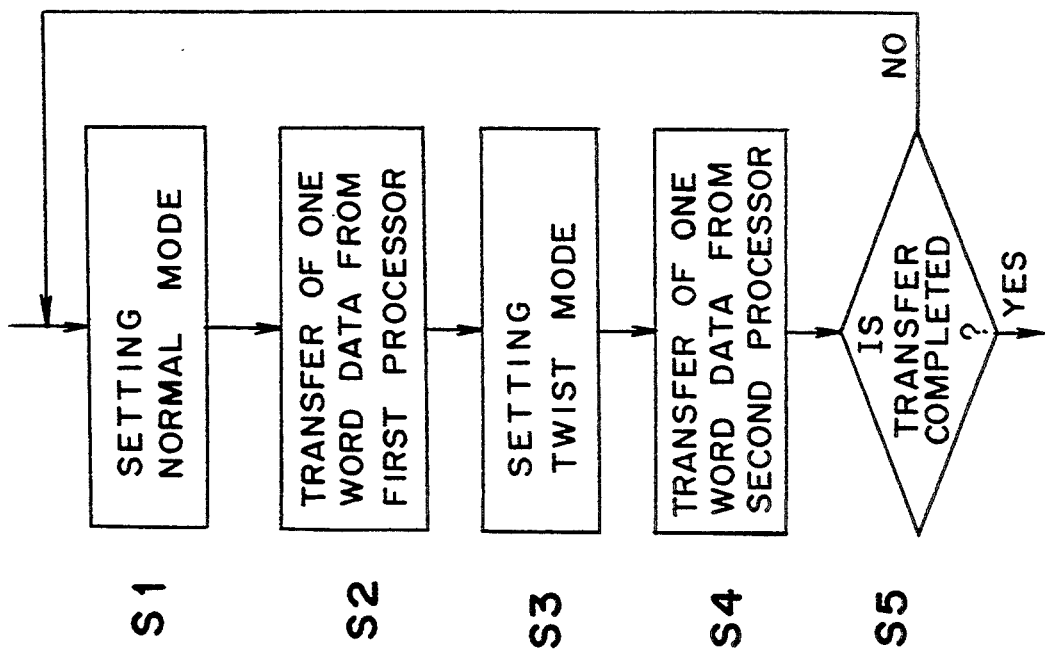
FIG. 4 is a flow chart showing the operation of the data transfer in the example shown in FIG. 3.

A preferred embodiment of the present invention will be described hereinafter with reference to FIGS. 5 and 6.

Figure 1:
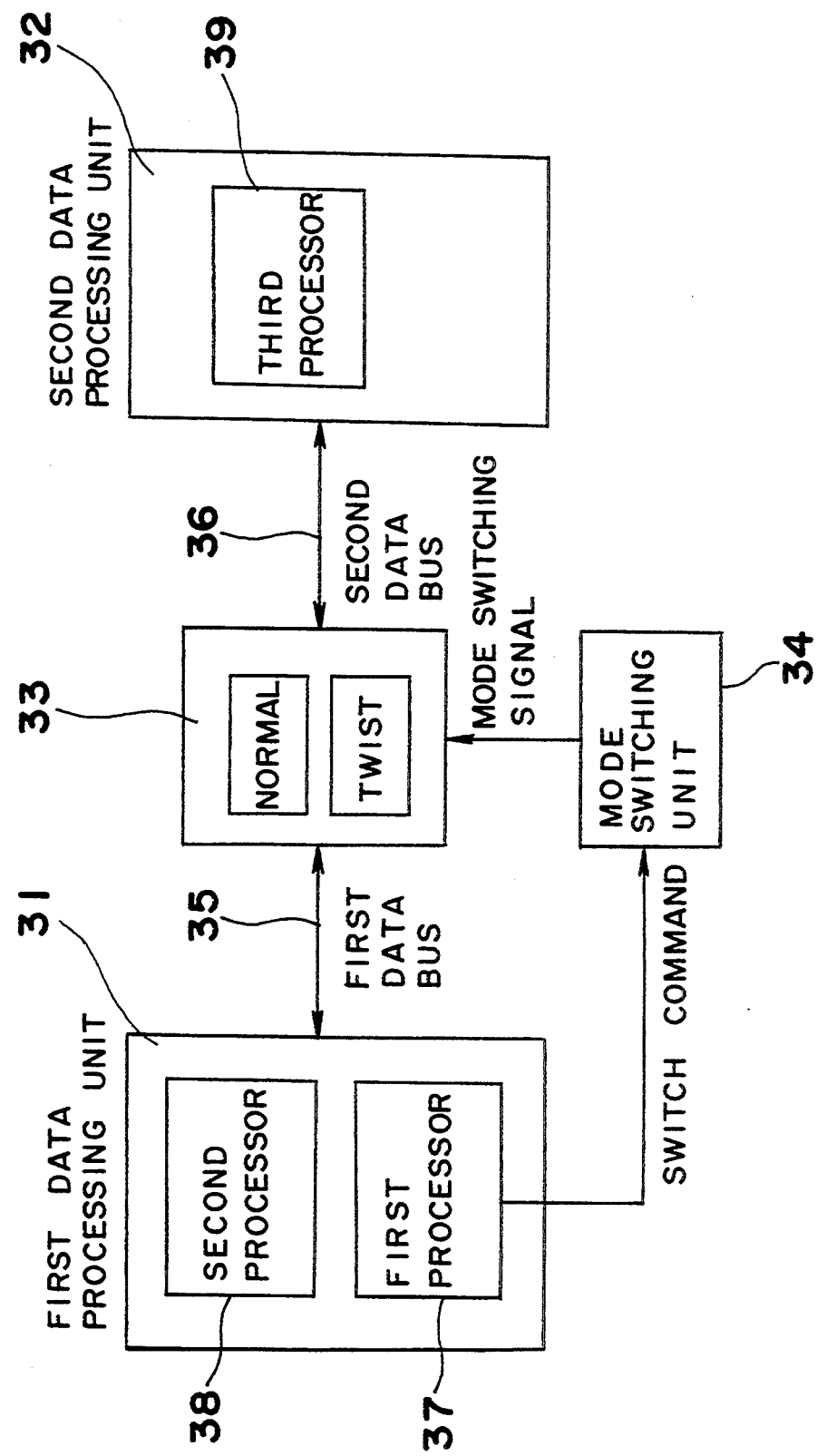
FIG. 1 is a block diagram showing an example of a conventional data processing system.
Figure 3:
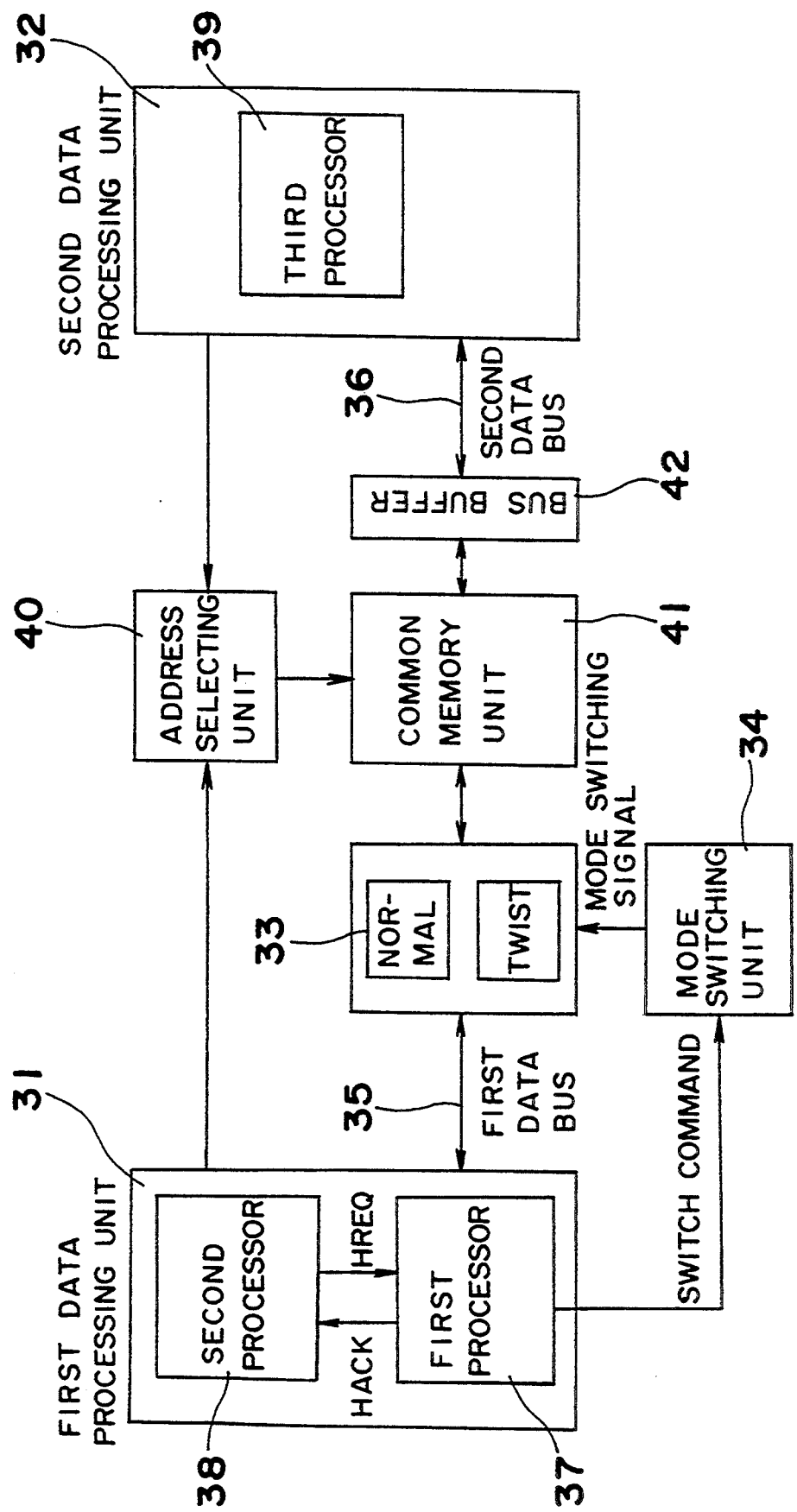
FIG. 3 is a block diagram showing another example of a conventional data processing system.
Figure 5:
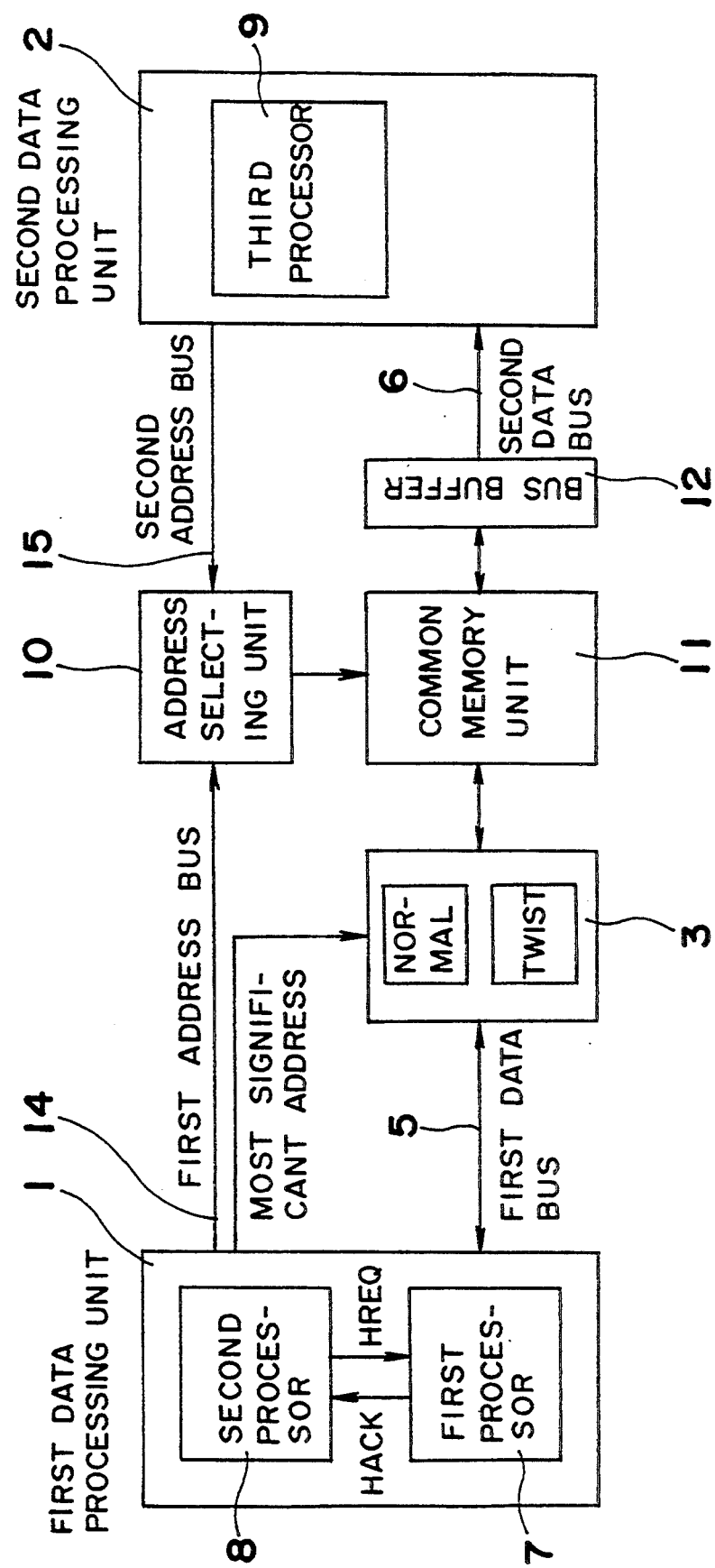
FIG. 5 is a block diagram showing an embodiment of a data processing system according to the present invention.

FIG. 5 shows a data processing system employing an embodiment of a data array conversion control system according to the present invention. In the data processing system, in a manner similar to that of the conventional data processing system shown in FIG. 3, there is provided a common memory unit 11 for delivery of data between a first data processing unit 1 and a second data processing unit 2. The first data processing unit 1 comprises a first processor 7 and a second processor 8, and the second data processing unit 2 comprises only a third processor 9. The first processor 7 is provided for processing character code data and the second processor 8 is provided for processing image data. And the third processor 9 is provided for processing the character code data of the same data array as that in the first processor 7 and for processing the image data of a data array different from that in the second processor 8. The output data of the first and second processors 7 and 8 are respectively transferred to the third processor 9 through a first data bus 5, a data array converting unit 3, a common memory unit 11, a bus buffer 12, and a second data bus 6. Since the common memory unit 11 is similar to the common memory unit 41 in the conventional system, it is possible to gain access for writing data into storage of the common memory unit 11 from both of the first and second data processing units 1 and 2 through first and second address buses 14 and 15 respectively and through an address selecting unit 10, the timing of the access to the common memory 11 is controlled by a control unit (not shown).

The mode of the operation of the data array converting unit 3 is switched between the normal mode and the twist mode on the basis of the most significant address bit of the data which is transferred from the first data processing unit 1 to the data array converting unit 3 through the first address bus 14 together with the data in a unit of one word generated from the first and second processors 7 and 8 respectively.

The data transfer operation in the data processing system is explained with reference to FIG. 6. First in the step S11, the character code data of one word are generated from the first processor 7 under the condition that the most significant address bit is set "0". When the most significant address bit is set "0", the conversion mode of the data array converting unit 3 is set to the normal mode and the input data of the data array converting unit 3 are transferred to the common memory unit 11 without converting the data array of the character code data. Subsequently in the step S12, the image data of one word are generated from the second processor 8 under the condition that the most significant address bit is set "1". When the most significant address bit is set "1", the conversion mode of the data array converting unit 3 is set to the twist mode and the input data of the data array converting unit 3 is transferred to the common memory unit 11 with the data array of the image data converted. These operations are repeated until the process of the transfer data is completed. The data stored in the common memory unit 11 are read out and transferred to the third processor 9 through the bus buffer 12 so as to be processed without converting the data array of the transferred data.

As described above, according to the present invention, since the most significant address bit of the data generated from the first or second processors 7 or 8 is set "0" or "1" and the conversion mode of the operation of the data array converting unit 3 is switched on the basis of the most significant address bit, therefore, it is not required to perform such a complicated process as performed in the conventional data processing system, so that the data processing speed can be increased and the data can be transferred at a high speed.

What is claimed is:

1. In a data array conversion system having a first data processing unit for processing character code data and image data and a second data processing unit for processing character code data aligned in a data array and image data aligned differently than the data array of the character code data, the first and second data processing units being connected to each other, the data array conversion system comprising:

common memory means for storing character code data and image data between the first data processing unit and the second data processing unit;

data transfer means for transferring the character code data, image data, and address data from the first data processing unit to the second data processing unit; and data array converting means for converting the data array of the image data from the first processing unit to image data aligned in a different manner according to a switching signal, said switching signal being a part of the address data.

2. The data array conversion system as claimed in claim 1, wherein the first data processing unit includes a first processor for generating character code data and a second processor for generating image data; and the second data processing unit including only a third processor for processing the character code data of a data array which is the same as that generated in the first processor and for processing image data of a data array aligned differently from that generated by the second processor.

3. The data array conversion system as claimed in claim 1, wherein a mode of said data array converting means is switched between a normal mode and a twist mode on the basis of said switching signal.

4. The data array conversion system as claimed in claim 1, wherein a most significant address bit in the address data is used as said switching signal.

5. The data array conversion control system as claimed in claim 1 further comprising:

access means for writing data into said common memory means from both of the first and second data processing units.

6. A data transfer system comprising:

first processing means for processing and outputting character data, said character data being arranged in a data array;

second processing means for processing and outputting image data, said image data being arranged in a data array;

third processing means for processing said character data from said first processing means and processing image data from said second processing means; and data transfer means for transferring character data and image data between said first, second, and third processing means;

said data transfer means aligning said data array of image data differently from an original alignment in response to a bit within an address for said data array of image data.

7. The system as claimed in claim 6, further comprising:

memory means for storing character data and image data from said data transfer means;

said memory means storing character data and image data from said third processing means.

8. The system as claimed in claim 6, wherein said bit is a most significant bit of said address.

9. A method for electronically transferring data between electronic devices, comprising the steps of:

(a) electronically processing and outputting character data in a first processor, the character data being arranged in a data array;

(b) electronically processing and outputting image data in a second processor, the image data being arranged in a data array;

(c) electronically processing character data from the first processor and processing image data from the second processor in a third processor;

(d) transferring character data and image data between the first, second, and third processors; and (e) electronically aligning the data array of image data differently from an original alignment before transferring image data from the second processor to the third processor in response to a bit within an address for the data array of image data.

10. The method as claimed in claim 9 wherein the bit is a most significant bit of the address.

* * * * *